United States Patent [19]

Harada

[11] 4,383,278
[45] May 10, 1983

[54] LIGHT BEAM MODULATING/DEFLECTING SYSTEM

[75] Inventor: Shigeo Harada, Asaka, Japan

[73] Assignee: Fuji Photo Film Co., Ltd., Kanagawa, Japan

[21] Appl. No.: 314,398

[22] Filed: Oct. 23, 1981

[30] Foreign Application Priority Data

Nov. 4, 1980 [JP] Japan .................... 55-155490

[51] Int. Cl.$^3$ .............................................. H04N 1/04
[52] U.S. Cl. .................... 358/285; 358/199; 358/293; 455/609
[58] Field of Search .............. 358/293, 285, 292, 199, 358/901; 485/609, 613

[56] References Cited

U.S. PATENT DOCUMENTS 3,860,747  1/1975  Orii et al. ...................... 358/901
4,107,517  8/1978  Cooper ........................... 455/613
4,175,230 11/1979  Richards et al. ............... 455/609

Primary Examiner—Robert L. Griffin
Assistant Examiner—Edward L. Coles
Attorney, Agent, or Firm—Gerald J. Ferguson, Jr.; Joseph J. Baker; C. Lamont Whitham

[57] ABSTRACT

A light beam modulating and deflecting system used to record and read out information by scanning with a light beam wherein modulated power is supplied to at least one light source on a rotating body by use of a fixed primary coil on a stationary substrate and a rotatable secondary coil secured to the rotating body, which coils can maintain electromagnetic coupling therebetween. The light beam is deflected by the rotation of the rotating body and modulated by the drive current for the light source.

2 Claims, 9 Drawing Figures

FIG.3
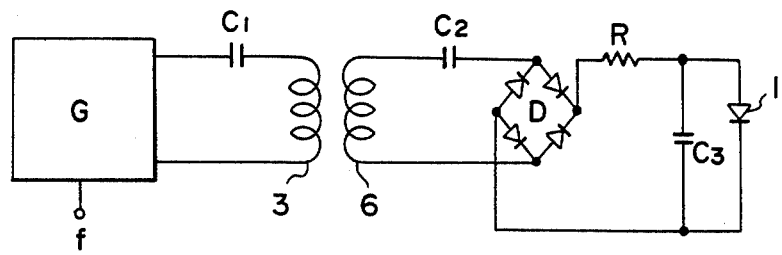
FIG.4A   FIG.4B
   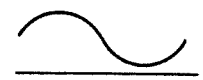
FIG.4C   FIG.4D   FIG.4E
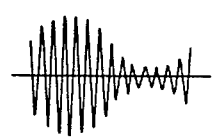      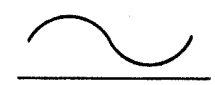
FIG.5
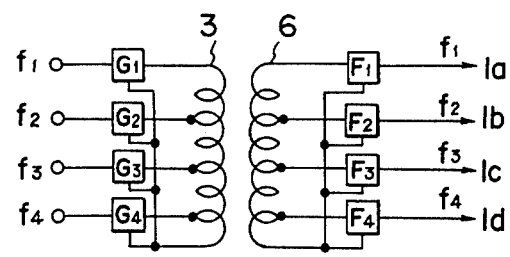

LIGHT BEAM MODULATING/DEFLECTING SYSTEM

BACKGROUND OF THE INVENTION

1. Field of the Invention

This invention relates to a light beam modulating/deflecting system used to record and read out information by scanning a scanning surface with a light beam such as a laser beam, and more particularly to a light beam modulating/deflecting system which has at least one light source (semiconductor laser, light emitting diode or the like) mounted on a rotating body and which simultaneously carries out both modulation and deflection of the light beam emitted from the light source rotating together with the rotating body, wherein the light beam is deflected through the rotation of the rotating body and, at the same time, modulated by means of the drive current for the light source.

2. Description of the Prior Art

A laser source can generate a light beam having high spatial interference and a high spectral line radiance that cannot be obtained with the other types of light sources. By virtue of this advantage, laser sources are used for many optical read out and recording systems. For example, the laser sources are used for read out systems such as in facsimile transmitters, automatic readers for label bar codes, and film flaw detectors. The laser sources are also used for recording systems such as in video disc recorders and facsimile receivers. In the past, these laser-based systems employed mainly the gas lasers such as He-Ne, He-Cd and Ar lasers. However, the gas laser sources are intrinsically large in size. Further, they necessitate additional light scanners and light modulators for deflecting and modulating the light beam during scanning with the light beam. Consequently, such systems using gas lasers are, in general, large in size and expensive. Thus, recently, semiconductor laser systems which are small and have high efficiency have come into increasingly wide use. One example of such a system is that disclosed in Japanese Patent Application No. 54(1979)-84224 in which a semiconductor laser source is rotated to form linear scanning lines.

The semiconductor laser scanning system described in Japanese Patent Application No. 54(1979)-84224 is small in size and inexpensive. It can modulate and deflect the light beam without necessitating additional devices. In this system, electric power is supplied to the rotating light source by use of brushes. However, semiconductor laser sources are easily damaged by electric shocks and, therefore, break due to the electrical noise caused by the brushes. This conventional system is also disadvantageous in that it cannot be used for long periods of time because of wearing of the brushes.

SUMMARY OF THE INVENTION

The object of the present invention is to provide a light beam modulating/deflecting system which can eliminate the disadvantages of the conventional laser systems as described above.

The present invention provides a light beam modulating/deflecting system comprising a primary coil mounted on a fixed substrate, and a secondary coil secured to a rotating body provided with a light source, a high-frequency signal modulated with a predetermined light modulating signal being applied to said primary coil, whereby electric power required to activate said light source and modulated with said light modulating signal is supplied to said rotatable secondary coil through non-contacting electromagnetic coupling of said primary and secondary coils. In a preferred embodiment of the light beam modulating/deflecting system according to the present invention, a plurality of light sources are mounted on the rotating body, said primary coil is provided with the same number of resonant circuits as that of said light sources, each of said resonant circuits having different resonant frequency, said secondary coil is also provided with the same number of resonant circuits having the same resonant frequencies as those of the resonant circuits of said primary coil, whereby the intensity of the light from each light source is modulated independently from the other light sources.

In the light beam modulating/deflecting system according to the present invention, the object of the present invention is accomplished by supplying electric power to the rotating body provided with a light source such as a semiconductor laser without using any means that contacts with the rotating body. Namely, the light beam modulating/deflecting system according to the present invention is characterized by supplying electric power to the rotating body by use of the fixed primary coil and the rotatable secondary coil which can maintain the electromagnetic coupling therebetween even during rotation of the rotatable secondary coil. The primary coil is mounted on the fixed substrate of the system, and the secondary coil is secured to the rotating body on which the light source is located.

With the above-described light beam modulating/deflecting system according to the present invention, electric shocks do not occur because the electric power is supplied in a contactless manner. Further, the rotating body of this system is light in weight since the components secured thereto are light. Therefore, the rotating body can be driven with a low-power motor.

BRIEF DESCRIPTION OF THE DRAWINGS

FIG. 3 is an electric circuit diagram of the system according to the present invention, FIGS. 4A to 4E are wave form charts explaining the processing of the light modulation signals in the system according to the present invention, and FIG. 5 is an electric circuit diagram of the system according to the present invention in which a plurality of light sources are provided.

DESCRIPTION OF THE PREFERRED EMBODIMENTS

Now the present invention will be described in detail with reference to the drawings.

Figure 1:
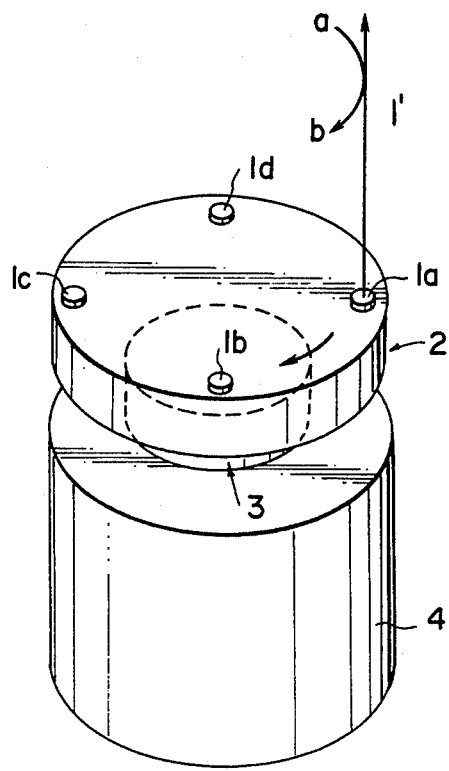
FIG. 1 is a perspective view of the light beam modulating/deflecting system according to the present invention.
Figure 2:
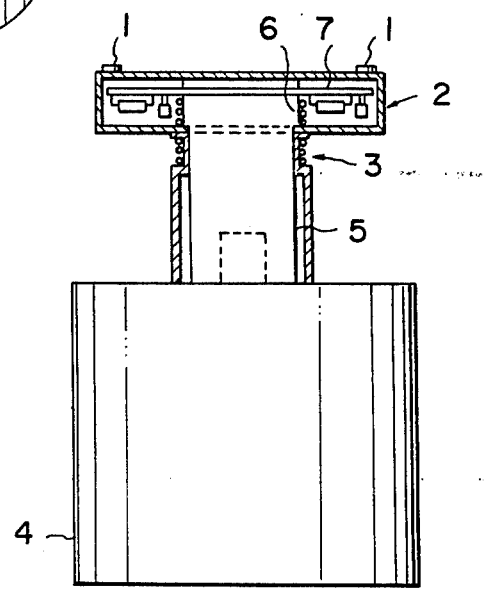
FIG. 2 is a partially sectional view of the light beam modulating/deflecting system according to the present invention.

Referring to FIGS. 1 and 2 showing a light beam modulating/deflecting system, semiconductor laser sources 1 are mounted on a rotating body 2. The rotating body 2 is fixed to a rotating shaft 5 of a high-speed rotating motor 4, and rotates together with the motor 4. The rotating shaft 5 is made of an electrical insulator. As the rotating body 2 rotates, laser beams 1' emitted from the semiconductor laser sources 1 (1a, 1b, 1c and 1d) scan a scanning surface in the a→b direction. The rotating body 2 is formed by, e.g., a hollow body, and is provided therein with a printed circuit board 7. This printed circuit board 7 includes resonant circuits, rectifying/smoothing circuits and the like.

Between the rotating body 2 and the rotating shaft 5 are located a primary coil 3 and a secondary coil 6. The primary coil 3 is fixed to the stationary substrate. The secondary coil 6 is secured to the rotating shaft 5 and the rotating body 2 so as to rotate therewith. The fixed primary coil 3 is slightly spaced apart from the rotatable secondary coil 6 so that the former may not rotate together with the latter.

A method of modulating the light beam in the light beam modulating/deflecting system of the present invention shown in FIGS. 1 and 2 will be explained below with reference to FIGS. 3 and 4.

FIG. 3 is an electric circuit diagram, and FIGS. 4A to 4E are wave form charts for the circuit shown in FIG. 3. In FIGS. 4A to 4E, the horizontal axis shows time, and the vertical axis the relative current value.

Referring to FIG. 3, a high-frequency oscillator G outputs a signal as shown in FIG. 4A. When a modulating signal f as shown in FIG. 4B is applied to the high-frequency oscillator G, the output thereof is modulated to a signal as shown in FIG. 4C. This modulated signal is fed to the fixed primary coil 3 via a capacitor C1 shown in FIG. 3. The fixed primary coil 3 and the capacitor C1 are adjusted in advance so that they have the same resonant frequency as the frequency of the high-frequency signal which is output from the high-frequency oscillator G. This adjustment is carried out to achieve effective power transmission. Through the rotatable secondary coil 6 is induced the signal having the wave form shown in FIG. 4C by the high-frequency signal that flows through the primary coil 3. The secondary coil 6 and a capacitor C2 are adjusted in advance so that they have the same resonant frequency as the aforesaid frequency of the high-frequency signal. By this adjustment, the electric power induced through the secondary coil 6 can be taken out effectively. The electromotive force obtained is rectified to a signal as shown in FIG. 4D by a rectifying circuit consisting of diodes D. This rectified signal is then separated from the high-frequency component by a capacitor 3. In this way, a signal as shown in FIG. 4E is applied to the semiconductor laser source 1. Consequently, the semiconductor laser source 1 emits light having an intensity corresponding to the modulating signal f. The components described above are arranged on the printed circuit board 7.

An experiment was carried out using the light beam modulating/deflecting system having the circuit shown in FIG. 3. The primary coil 3 and the secondary coil 6 having inductances of 0.1 to 0.2 μH were spaced about 0.5 mm apart from each other. A high-frequency signal having a frequency of 100 to 200 MHz was output from the high-frequency oscillator G. The frequency of the modulating signal f was set at 1 to 10 MHz. The capacitors C1 and C2 had capacitances of 10 to 20 pF. In this experiment, an electric power of 0.7 W was applied to the system, and about 0.14 W (about 20% of the power applied) was transmitted to the semiconductor laser source 1.

The system according to the present invention has been explained above with reference to amplitude modulation. However, it is also possible to carry out frequency modulation, pulse code modulation or the like by changing the demodulation circuit.

A method of driving a plurality of light sources will now be explained with reference to FIG. 5. In FIG. 5, reference characters f1, f2, f3 and f4 denote signals for modulating the light from light sources 1a, 1b, 1c and 1d, respectively. The modulating signals f1 through f4 are applied to high-frequency oscillators G1 through G4, respectively. Outputs from the high-frequency oscillators G1 through G4 are fed to the fixed primary coil 3 which has been adjusted to constitute the resonant circuits turned to the respective frequencies of the high-frequency oscillators G1 through G4. As described above, the rotatable secondary coil 6 is electromagnetically coupled with the fixed primary coil 3. Therefore, electromotive force at the aforesaid frequencies can be induced through the rotatable secondary coil 6 and applied to the resonant circuits F1 through F4, respectively. The resonant circuit F1 is tuned to the frequency of the high-frequency oscillator G1 and gives the signal f1. Similarly, the resonant circuits F2 through F4 output signals f2 through f4, respectively. These signals f1 through f4 are respectively applied to the semiconductor laser sources 1a, 1b, 1c and 1d. In this way, the intensity of light from each of the semiconductor laser sources 1a, 1b, 1c and 1d can be modulated independently.

With the above-mentioned light beam modulating/deflecting system according to the present invention, the power-modulated signal can be sent to the laser source by use of a combination of the fixed primary coil and the rotatable secondary coil without using any contacting means. Accordingly, the system of the present invention has longer life than the conventional system in which brushes are used to supply power. Further, the system according to the present invention does not generate electric shocks that can damage the semiconductor laser sources. In addition, the system according to the present invention can be compactly constructed and can operate with a lower power motor than can the conventional systems using a power supplying mechanism based on a generator. The system of the present invention is also advantageous in that the electrical adjustment of the parts thereof can be carried out even when the rotating body is stationary.

Moreover, with the light beam modulating/deflecting system according to the present invention, the light beams of a plurality of light sources located on the rotating body can easily be modulated independently from each other.

I claim:

1. A light beam modulating/deflecting system comprising a primary coil mounted on a fixed substrate, and a secondary coil secured to a rotating body provided with a light source, a high-frequency signal modulated with a predetermined light modulating signal being applied to said primary coil, whereby electric power which is required to activate said light source and modulated with said light modulating signal is supplied to said rotatable secondary coil through non-contacting electromagnetic coupling of said primary and secondary coils.

2. A light beam modulating/deflecting system as defined in claim 1 wherein a plurality of light sources are mounted on said rotating body, said primary coil is provided with the same number of resonant circuits as that of said light sources, each of said resonant circuits having a different resonant frequency, said secondary coil is also provided with the same number of resonant circuits having the same resonant frequencies as those of the resonant circuits of said primary coil, whereby the intensity of light from each light source is modulated independently from the other light sources.

* * * * *